US012780348B2

(12) United States Patent
Maier et al.

(10) Patent No.: US 12,780,348 B2
(45) Date of Patent: Nov. 3, 2026

(54) VEHICLE AND BRAKE ASSISTANCE DEVICE FOR A HYDRAULIC BRAKE SYSTEM FOR A VEHICLE

(71) Applicant: Robert Bosch GmbH, Stuttgart (DE)

(72) Inventors: Oliver Maier, Stuttgart (DE); Georg Widmaier, Leonberg (DE); Alessandro Moia, Holzgerlingen (DE); Robin Vesenmaier, Ottobrunn (DE); Michael Vetter, Ohmenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 18/552,789

(22) PCT Filed: Feb. 11, 2022

(86) PCT No.: PCT/EP2022/053330
§ 371 (c)(1),
(2) Date: Sep. 27, 2023

(87) PCT Pub. No.: WO2022/207172
PCT Pub. Date: Oct. 6, 2022

(65) Prior Publication Data

US 2024/0174319 A1 May 30, 2024

(30) Foreign Application Priority Data

Mar. 30, 2021 (DE) ..................... 10 2021 203 227.3

(51) Int. Cl.
*B62L 3/02* (2006.01)
*B60T 8/32* (2006.01)

(52) U.S. Cl.
CPC ............ *B62L 3/023* (2013.01); *B60T 8/3225* (2013.01)

(58) Field of Classification Search
CPC . B60T 8/3225; B60T 8/32; B60T 8/42; B60T 8/404; B60T 8/1706; B60T 8/4022;
(Continued)

(56) References Cited

U.S. PATENT DOCUMENTS 4,693,521 A * 9/1987 Takata .................. B60T 8/3265 60/566
5,297,862 A * 3/1994 Reinartz ............... B60T 8/4018 303/113.1
(Continued)

FOREIGN PATENT DOCUMENTS

CN 103906661 A 7/2014
CN 104936837 A 9/2015
(Continued)

OTHER PUBLICATIONS

International Search Report corresponding to PCT Application No. PCT/EP2022/053330, mailed Jun. 24, 2022 (German and English language document) (5 pages).

*Primary Examiner* — David R Morris
*Assistant Examiner* — San M Aung
(74) *Attorney, Agent, or Firm* — Maginot, Moore & Beck LLP

(57) ABSTRACT

A vehicle is driven by muscle power and/or an electric motor and includes a brake assistance device for a hydraulic brake system. The brake assistance device has a sensor with a first piston, a compensation volume with a second piston and a pretensioning element, a 2/2-way valve, a brake piston, and an actuator. The pretensioning element is configured to exert a pressure onto the second piston and thus onto a hydraulic fluid of the hydraulic brake system. The actuator is configured to move the second piston selectively in a first direction or in a second direction oriented opposite the first direction.

11 Claims, 4 Drawing Sheets

(58) Field of Classification Search
CPC .... B60T 8/4028; B60T 8/4266; B60T 8/4863; B60T 11/20; B60T 13/142; B60L 3/00; B62L 3/00; B62L 3/08; B62L 3/023; B62L 5/20
USPC ........................................................ 303/116.4
See application file for complete search history.

(56) References Cited

U.S. PATENT DOCUMENTS

2006/0228236 A1* 10/2006 Krisher ................. F16D 29/005
74/25
2015/0344009 A1* 12/2015 Hagspiel ................. B62L 3/023
303/119.1

FOREIGN PATENT DOCUMENTS

| | | | | |
|---|---|---|---|---|
| CN | 106458167 | A | 2/2017 | |
| CN | 110225850 | A | 9/2019 | |
| DE | 10 2012 222 058 | A1 | 6/2014 | |
| DE | 10 2017 202 021 | A1 | 8/2018 | |
| DE | 10 2019 213 326 | A1 | 3/2021 | |
| EP | 2 857 268 | A1 | 4/2015 | |
| EP | 3 124 344 | A1 | 2/2017 | |
| EP | 3 628 556 | A1 | 4/2020 | |
| EP | 3345821 | B1 * | 8/2020 | ................ B62L 3/02 |
| JP | H1-119462 | A | 5/1989 | |
| JP | H6-53345 | U | 7/1994 | |
| JP | H7-40820 | A | 2/1995 | |
| JP | H9-216548 | A | 8/1997 | |
| JP | 4089143 | B2 | 5/2008 | |
| JP | 2009-29425 | A | 2/2009 | |
| JP | 2009-241799 | A | 10/2009 | |
| JP | 2016-203932 | A | 12/2016 | |
| JP | 2019-6347 | A | 1/2019 | |
| JP | 7040820 | B2 | 3/2022 | |
| WO | 2018/083615 | A1 | 5/2018 | |

* cited by examiner

VEHICLE AND BRAKE ASSISTANCE DEVICE FOR A HYDRAULIC BRAKE SYSTEM FOR A VEHICLE

This application is a 35 U.S.C. § 371 National Stage Application of PCT/EP2022/053330, filed on Feb. 11, 2022, which claims the benefit of priority to Serial No. DE 10 2021 203 227.3, filed on Mar. 30, 2021 in Germany, the disclosures of which are incorporated herein by reference in their entirety.

BACKGROUND

The disclosure relates to a vehicle and a brake assistance device for a hydraulic brake system for a vehicle which can be driven by muscle power and/or an electric motor. In particular, the disclosure relates to a brake assistance device for an electric bike, a pedelec, a cargo electric bike and a light electric vehicle such as a wheelchair, etc.

The standard ABS implementation uses a pump between the hand force of the driver and the storage chamber.

The serious weakness of this implementation is that the size of the storage chamber is limited by the regulatory minimum delay, so compatibility with the basic brakes of this system is very limited.

If a leak in the exhaust valve causes the storage chamber to inadvertently fill with normal braking, then the driver must still be able to achieve the specified regulatory minimum delay with the remaining brake lever travel. In other words, the size of the storage chamber must be limited. Otherwise, if the storage chamber is too large, then the total displacement volume of the brake lever would flow into the storage chamber.

The problem is very pronounced in the case of wheel brakes due to the limited displacement volume of the brake lever and the adjustable hand brake lever position. As the driver adjusts the lever close to the handlebar, the amount of brake fluid that the lever can displace decreases. As a result, the standard ABS circuit is not compatible with all conventional basic brakes because the size of the storage chamber is so limited that ABS functionality cannot be ensured (insufficient braking pressure reduction is possible due to the low volume of the storage chamber).

EP 3 124 344 A1 discloses a hydraulic braking system that uses an electric motor having a displaceable piston.

The piston on the hand lever is directly connected to a storage chamber. The movable piston in the storage chamber is connected to an electric drive. A bypass is provided to direct oil from the hand lever directly to the brake caliper. If a blocking of the wheel occurs, a piston supported by a spring is displaced by motor power. Depending on a position of the piston, the bypass is separated between the hand lever and the brake caliper. By further displacing the piston, the pressure on the brake caliper can be modulated.

Since this concept does not employ a storage chamber and the pressure reduction is carried out by the piston exerting a force against the brake lever, there is always sufficient brake lever distance available for the driver to achieve the regulatory minimum delay, thus ensuring compatibility with basic brakes. One problem of the system is that the electric motor must work against the hand pressure generated by the driver. This varies from driver to driver. If the hand pressure is too great, then the actuator may no longer be able to apply the required torque to displace the piston. Particularly in the case of braking on loose ground, this circumstance is particularly critical because there is a large pressure difference between the chambers that the actuator must compensate for. In addition, the power demand increases significantly with higher hand pressure. In other words, the power source or battery must provide more power to the motor.

WO 2018/083615 A1 discloses a brake assistance system without an intake valve, which enables further reduction of the assembly space occupied by the system, but has the disadvantage that no gradient control is possible to limit the braking pressure gradient. The driver can thereby increase the pressure into the brake system. A further disadvantage of the brake system is that, in the event of a malfunction of the actuator, the pistons can lower the pressure in the brake line below 1 bar. Due to the negative pressure generated, the actuator can draw air into the hydraulics through the seals and thus jeopardize their functionality.

One object of the disclosure is to provide an improved concept and improved design of the mechanical components of a hydraulic brake assistance system, which overcomes the deficiencies known in the prior art, at least maintains function and optionally simplifies the design.

SUMMARY

The disclosure achieves the aforementioned object by means of a brake assistance device for a hydraulic brake system for a vehicle which can be driven by muscle power and/or an electric motor. The brake assistance device comprises a sensor, which can comprise a first piston. To actuate the first piston, the sensor can comprise or cooperate with a hand lever. The first piston acts on a first line section of the hydraulic brake system. In addition, a compensation volume is provided, which comprises a second piston. The second piston is arranged in the compensation volume such that it applies a pressure to the hydraulic fluid/brake fluid by a pretensioning element (e.g., a pretensioning spring). The compensation volume can represent a cylinder for this purpose, or it can comprise such a cylinder which cooperates with the second piston. In particular, a volume arranged beyond the second piston relative to the pretensioning element can be filled with hydraulic fluid. The first line section is terminated by a 2/2-way valve. The 2/2-way valve is therefore hydraulically coupled to the first piston of the sensor. The 2/2-way valve can also be understood as an intake valve assembly or a controlled intake valve because it is actuated as a function of a rotational wheel speed in order to prevent a permanent blocking of the wheel. For this purpose, the 2/2-way valve interacts with a brake piston in a brake caliper, which is associated with the aforementioned wheel. According to the disclosure, an actuator is also provided, which interacts with the second piston in the compensation volume. The pretensioning element is designed to apply a pressure to the second piston, and thus to a hydraulic fluid of the brake system. In particular, this pretensioning element can be designed to affect the pressure in such a second line section of the hydraulic system, which is arranged opposite the 2/2-way valve with respect to the sensor. The actuator is designed to move the second piston selectively in a first direction or in a second direction opposite the first direction. In other words, the actuator can increase or decrease the force acting on the second piston generated by the pretensioning element. In other words, the actuator is designed to deflect the second piston to a working point set by the pretensioning element and the hydraulic fluid into different, in particular opposite directions, depending on the force-effect direction. In this way, the brake assistance system according to the disclosure is able to modulate the brake pressure also below the storage chamber pretension.

To ensure that the braking system according to the disclosure provides the specified regulatory minimum delay in the event of an AV leakage, one possible solution is to set the storage chamber spring pretension. A detailed analysis of various basic brakes was used to determine the brake pressure required for each brake to achieve the regulatory minimum delay. This value varies between about 30 bar or about 50 bar. If the storage chamber spring is pretensioned with a pretensioning force that hydraulically corresponds to 50 bar, then it is ensured that the system always reaches the regulatory minimum delay, even in case of exhaust valve (AV) leakage.

The actuator can, e.g., comprise an electric motor with a spindle drive. The spindle drive can in particular lie in a direction coaxial to the direction of movement of the second piston, or to an axis of symmetry of the second piston. A sufficiently strong force effect is therefore ensured in both the first and second directions.

Preferably, an exhaust valve can be provided between the brake piston and the compensation volume. The exhaust valve can be designed in a manner similar to the intake valve or the 2/2-way valve. Compared to the 2/2-way valve, however, the exhaust valve is designed to shut off in the absence of an applied signal, while the 2/2-way valve of the inlet valve can be designed to enable hydraulic fluid to pass in the absence of an applied signal. In the event of a malfunction of the exhaust valve (e.g., in the event of a power failure after a reduction in brake pressure (e.g. after a negative u jump). So, a sudden reduction in the friction coefficient between tires and subsurface), the exhaust valve would close and the pretensioning element would not be able to displace the brake fluid/hydraulic fluid from the compensation container. The solution can be proposed to provide a check valve in the arrangement, which is arranged, on the one hand, between the outlet valve and the compensation volume and, on the other hand, between the sensor and the 2/2-way valve (first line section). The check valve can be oriented to always permit flow towards the sensor. The check valve thereby enables the pretensioning element to displace the hydraulic fluid from the compensation volume in the event of an error, even when the exhaust valve is closed and to provide it to the driver/sensor for braking.

A similar effect can be established by connecting the check valve, on the one hand, between the exhaust valve and the compensation volume and, on the other hand, between the 2/2-way valve and the brake piston. Also in this case, flow towards the brake piston or towards the 2/2-way valve can be permitted.

A separable connection can be provided between the second piston and the actuator to prevent the piston from generating negative pressure and thus drawing air into the hydraulic system in the event of an actuator malfunction. The connection can basically be understood as a selectively rigid connection, or as a selectively loose connection. In particular, the connection can be rigid with respect to a pressure of the actuator on the second piston, whereas the actuator cannot, or is only indirectly able to, pull the second piston out of the area filled by the hydraulic fluid. For example, the actuator can be coupled to the piston in tension only via the pretensioning element while it is establishing a rigid connection or contact with the second piston under pressure. Given the releasable connection, movement of the piston out of the hydraulic system is forced solely by the hydraulic pressure such that the piston does not move too far out of the hydraulic system once the brake pressure reaches 1 bar. Equilibrium with the ambient pressure is thus always ensured.

Ideally, the pretensioning element is designed to establish, in conjunction with the second piston (and without force from the actuator), a hydraulic pressure of at least 40 bar, in particular 50 bar, preferably 60 bar. In other words, the working point is set at 40 or 50 bar, preferably 60 bar, which can subsequently be modulated by the actuator. Increasing the pressure in the hydraulic system can reduce the number of situations in which the electric motor needs to become active to prevent brake fluid from flowing into the compensation volume. However, a higher working point position of the hydraulic pressure counteracts the dynamics and power consumption of the system so that much higher values should be avoided.

The pretensioning element can comprise a spiral spring. In other words, the second piston can be pushed towards the hydraulic fluid by means of the coil spring. In the case of a separable connection, the spiral spring can be arranged on the second piston on the one hand, and on the actuator on the other hand, and thus optionally can also be subjected to tensile stress when the actuator strives to pull the second piston out of the hydraulic system by means of the spiral spring.

According to a second aspect of the disclosure, a vehicle driven by muscle power and/or an electric motor (in particular an electric bike, pedelec, cargo electric bike, light electric vehicle, wheel chair, e-trike, or e-quad) is proposed, which comprises a braking assistance device according to the first mentioned aspect of the disclosure. The features, feature combinations and the advantages resulting thereby correspond to those described in connection with the aspect specified in the introductory section clearly enough that reference is made to the first aspect of the disclosure in order to avoid repetition.

BRIEF DESCRIPTION OF THE DRAWINGS

Exemplary embodiments of the disclosure are described in detail hereinafter with reference to the accompanying drawings. Shown are.

DETAILED DESCRIPTION

Figure 1:
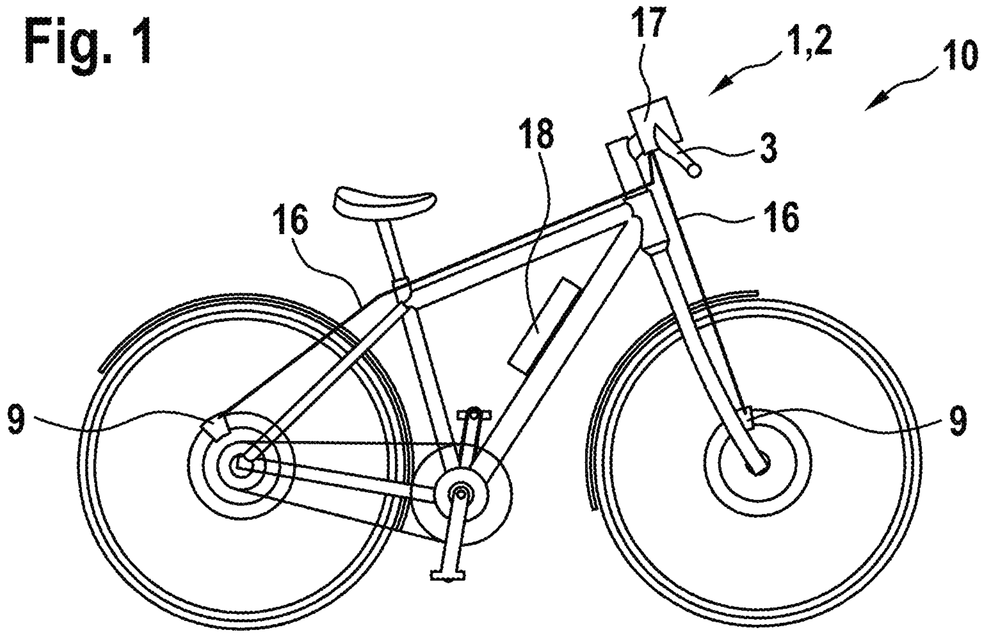
FIG. 1 a schematic illustration of an electric bike machine designed according to the disclosure with a brake assistance device designed according to the disclosure.

FIG. 1 shows an electric bike 10 as an exemplary embodiment of a vehicle designed according to the disclosure with an exemplary embodiment of a brake assistance device 1 for a hydraulic brake system 2. A respective brake piston 9 is provided in a brake caliper on the front wheel as well as on the rear wheel of the electric bike 10. These brake pistons 9 are hydraulically connected via hydraulic lines 16 to a hand lever 3 as a sensor, as well as to a control unit 17. A battery 18 traction providing energy also feeds the sensors and actuators as well as the electric valves of the brake assistance device 1.

Figure 2:
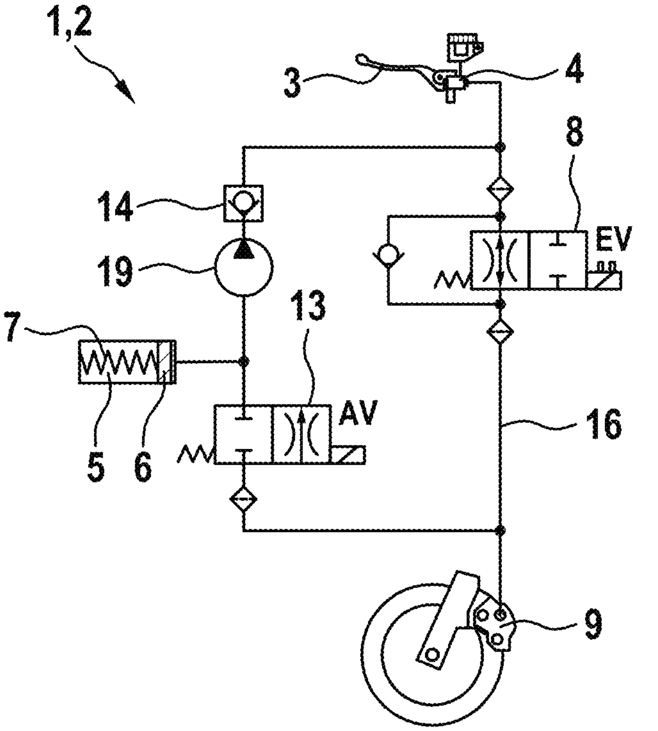
FIG. 2 a braking system designed according to the prior art in a first operating state with a nearly empty compensation volume.

FIG. 2 shows a brake assistance device 1 designed according to the prior art for a hydraulic brake system 2 in a first operating state. A pump 19 is in this case used to make hydraulic fluid temporarily stored in the compensation volume 5 via the outlet valve 13 and optionally via a check valve 14 available again to the sensor 3 or the first piston 4 and the 2/2-way valve 8. The compensation volume 5 is almost completely empty in the operating state shown. The pretensioning element in the form of a spiral spring 7 is relaxed due to the comparatively empty compensation volume 5.

Figure 3:
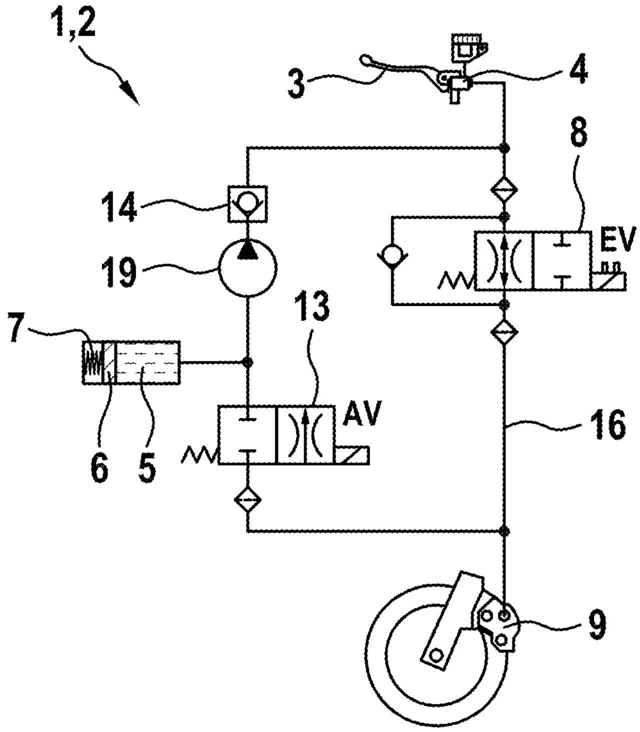
FIG. 3 a braking system designed according to the prior art in a first operating state with a filled compensation volume.

FIG. 3 shows the situation shown in FIG. 2 in which the compensation volume 5 is now almost completely filled. A hydraulic line 16 closes the circuit between the 2/2-way valve 8 and the exhaust valve 13 and couples the brake piston 9 to the hydraulic circuit. The pretensioning element 7 in the form of a spiral spring is highly compressed due to the filled compensation volume 5.

Figure 4:
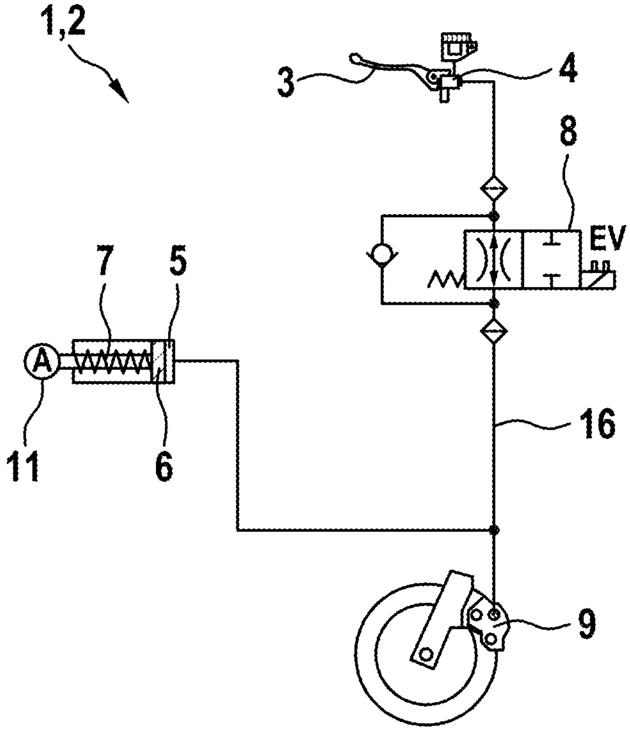
FIG. 4 a first embodiment of a brake assistance device designed according to the disclosure without an exhaust valve.

FIG. 4 shows a first embodiment of a brake assistance device 1 according to the disclosure for a hydraulic brake system 2. By way of a hand lever 3 of a sensor and a first piston 4, hydraulic fluid can flow through the 2/2-way valve 8 via a hydraulic line 16 in the direction of the brake piston 9 depending on a control signal. A compensation volume 5 is provided to temporarily store outflowing hydraulic fluid. The working point, or rather the hydraulic pressure, is adjusted via a pretensioning element 7 in the form of a spiral spring. By way of a separable connection (not shown), an actuator in the form of a spindle motor 11 is operatively connected to the second piston 6. The spindle motor 11 can thus apply tensile and compressive forces on the second piston 6.

Figure 5:
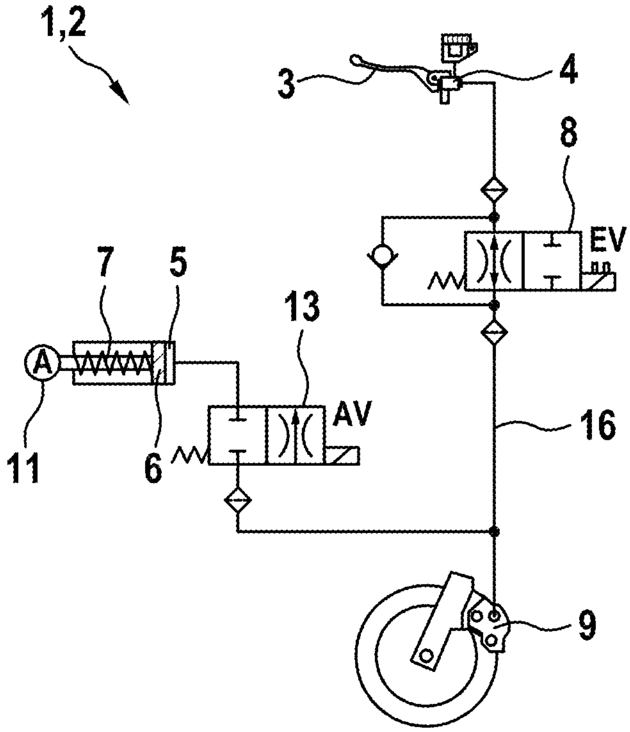
FIG. 5 a second exemplary embodiment of a brake assistance device with an exhaust valve designed according to the disclosure.

FIG. 5 shows the arrangement presented in FIG. 4, wherein a controllable exhaust valve 13 is provided between the compensation volume 5 and the brake piston 9 and the 2/2-way valve 8. Depending on a control signal, the exhaust valve 13 can be opened. If the control signal is absent, then the valve closes.

Figure 6:
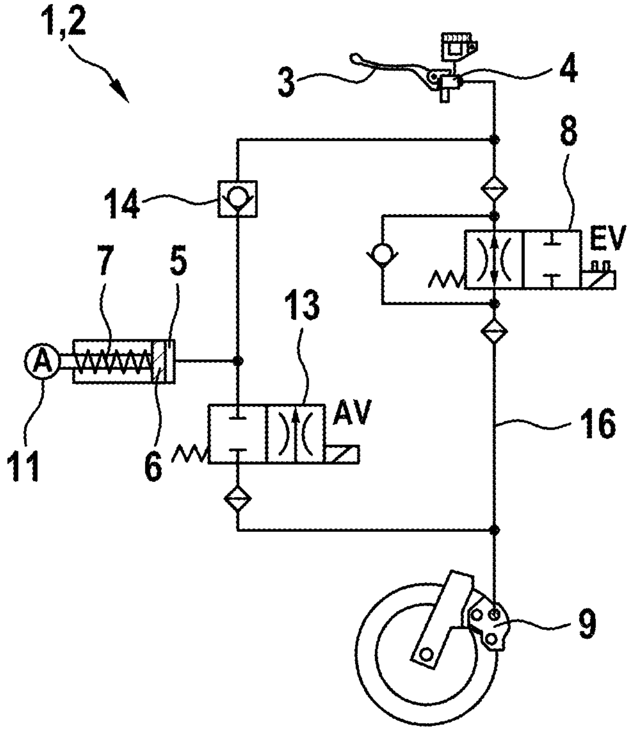
FIG. 6 a third exemplary embodiment of a brake assistance device with a check valve designed according to the disclosure.

FIG. 6 shows the arrangement presented in FIG. 5, which is arranged by introducing a check valve 14 between the exhaust valve 13 and the compensation volume 5 on the one hand and the first piston 4 and in the 2/2-way valve 8 on the other hand. A return flow of hydraulic fluid from the compensation volume 5 in the direction of the 2/2-way valve 8 is thus always possible, whereas the check valve 14 blocks in the direction of the compensation volume 5.

Figure 7:
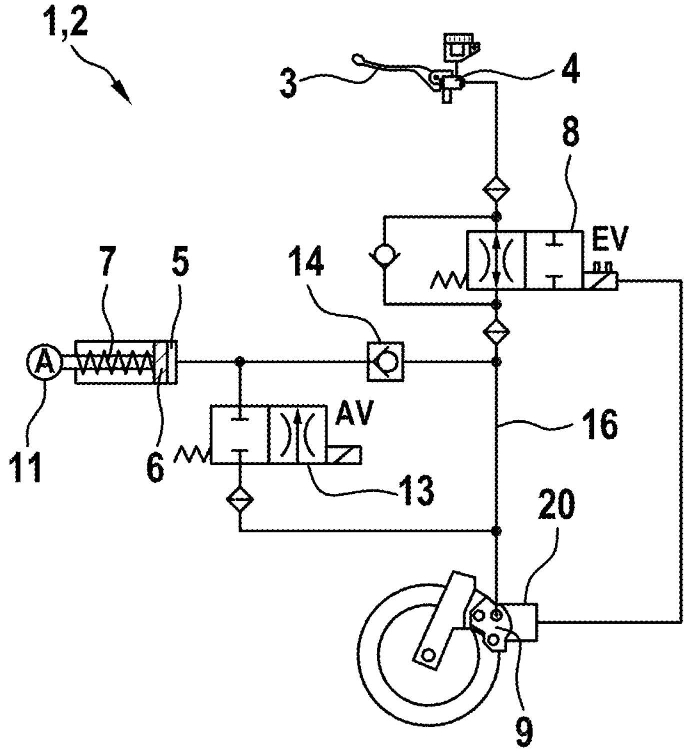
FIG. 7 a fourth exemplary embodiment of a brake assistance device with a check valve designed according to the disclosure.

FIG. 7 shows a modified arrangement, differing from FIG. 6 in that the check valve 14 is not connected to the first line section, but to a second line section between the 2/2-way valve 8 and the brake piston 9. In addition, a sensor 20 is arranged in the region of the brake piston 9, which sensor determines the rotational wheel speed and outputs a correspondingly generated control signal to the 2/2-way valve 8.

Figure 8:
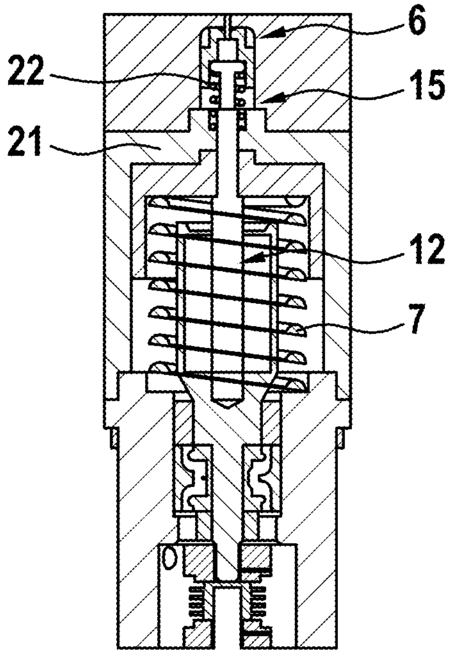
FIG. 8 a sectioned detail view of an exemplary embodiment of an actuator usable according to the disclosure with a selectively separable connection to a second piston.

FIG. 8 shows a sectioned detail view of an actuator 11 with a spindle drive 12, which is coupled to a second piston 6 via a selectively separable connection 15. When the spindle drive 12 pushes on the second piston 6, the positions of the spindle drive 12 and the second piston 6 are immediately coupled to each other. If the spindle drive 12 is removed from the second piston 6, then the spindle drive 12 and the piston 6 are only coupled to each other via the spiral spring 7. The actuator 11 can compress the large spring 7 via the spring plate 21 and the spindle 12. The small piston 6 comprises a further small spring 22 and no fixed connection to the spring plate 21. When the spring plate 21 and the spindle 12 move upwards, they push the small piston 6 upwards. When the spring plate 21 and the spindle 12 move downwards, hydraulic pressure moves the piston 6 downwards. If there is no pressure in the brake line, then the piston 6 cannot move downwards and the connection between piston and spindle 12/spring plate 21 opens.

The invention claimed is:

1. A brake assistance device for a hydraulic brake system for a vehicle, the vehicle driven by muscle power and/or an electric motor, the brake assistance device, comprising:
- a sensor including a first piston;
- a compensation volume in which a second piston and a pretensioning element are arranged;
- a 2/2-way valve;
- a brake piston; and
- an actuator,
- wherein the pretensioning element is configured to exert a pressure onto the second piston, and thus onto a hydraulic fluid of the hydraulic brake system, and
- wherein the actuator is configured to move the second piston selectively in a first direction, or in a second direction oriented opposite the first direction.

2. The brake assistance device according to claim 1, wherein the actuator comprises an electric motor with a spindle drive.

3. The brake assistance device according to claim 1, wherein the sensor comprises a hand lever.

4. The brake assistance device according to claim 1, further comprising:
- an exhaust valve located between the brake piston and the compensation volume; and
- a check valve located (i) between the exhaust valve and the compensation volume, and (ii) between the sensor and the 2/2-way valve.

5. The brake assistance device according to claim 1, further comprising:
- an exhaust valve located between the brake piston and the compensation volume and
- a check valve located (i) between the exhaust valve and the compensation volume, and (ii) between the 2/2-way valve and the brake piston.

6. The brake assistance device according to claim 1, wherein a selectively separable connection is provided between the actuator and the second piston.

7. The brake assistance device according to claim 1, wherein the pretensioning element is configured to establish a hydraulic pressure of at least 40 bar.

8. The brake assistance device according to claim 1, wherein the pretensioning element comprises a spiral spring.

9. The brake assistance device according to claim 1, wherein:
- the pretensioning element is configured to exert the pressure onto the second piston in the first direction, and
- the actuator is configured to selectively exert a force on the second piston in the first direction to supplement the pressure of the pretensioning element, or in a second direction oriented opposite the first direction to oppose the pressure of the pretensioning element.

10. A vehicle driven by muscle-power or an electric motor, comprising:

a hydraulic brake system; and a brake assistance device operably connected to the hydraulic brake system, the brake assistance device including:

a sensor including a first piston;

a compensation volume in which a second piston and a pretensioning element are arranged;

a 2/2-way valve;

a brake piston; and an actuator, wherein the pretensioning element is configured to exert a pressure onto the second piston, and thus onto a hydraulic fluid of the hydraulic brake system, and wherein the actuator is configured to move the second piston selectively in a first direction, or in a second direction oriented opposite the first direction.

11. The vehicle according to claim 10, wherein:

the pretensioning element is configured to exert the pressure onto the second piston in the first direction, and the actuator is configured to selectively exert a force on the second piston in the first direction to supplement the pressure of the pretensioning element, or in a second direction oriented opposite the first direction to oppose the pressure of the pretensioning element.

* * * * *